United States Patent [19]

Yarnell

[11] Patent Number: 4,561,321
[45] Date of Patent: Dec. 31, 1985

[54] SHIFT BRACKET ASSEMBLY

[75] Inventor: James A. Yarnell, Temperance, Mich.

[73] Assignee: Dana Corporation, Toledo, Ohio

[21] Appl. No.: 553,653

[22] Filed: Nov. 21, 1983

Related U.S. Application Data

[63] Continuation-in-part of Ser. No. 370,640, Apr. 21, 1982, abandoned.

[51] Int. Cl.⁴ .............................................. G05G 9/14
[52] U.S. Cl. ..................................... 74/473 R; 74/475
[58] Field of Search ................... 74/473 R, 475, 476; 267/169

[56] References Cited

U.S. PATENT DOCUMENTS

| | | | |
|---|---|---|---|
| 1,830,797 | 11/1931 | Lapsley | 74/475 |
| 2,206,315 | 7/1940 | Zimmerman | 267/169 X |
| 2,538,653 | 1/1951 | Perkins | 74/473 R |
| 3,866,488 | 2/1975 | Nakata et al. | 74/475 |
| 3,937,100 | 2/1976 | Huffman | 74/476 |
| 4,275,612 | 6/1981 | Silvester | 74/475 X |
| 4,279,175 | 7/1981 | Breed | 74/473 R |

Primary Examiner—Allan D. Hermann
Attorney, Agent, or Firm—Frank McDonald

[57] ABSTRACT

A shift bracket assembly for a manually operated transmission provides a lighter and more desirable spring force on a transmission shift lever, with fewer parts than as required by the prior art. The bracket is disposed for affixation to, and movement with, an axially movable shift rail; the bracket including a transversely aligned plunger slidably disposed within a bore in the bracket. In a preferred embodiment the bore is stepped, and slidingly retains a mating stepped plunger, the plunger including a cam surface for continuous coaction with a spring and poppet ball at all operative positions of the plunger.

7 Claims, 6 Drawing Figures

SHIFT BRACKET ASSEMBLY

This application is a continuation-in-part of copending Ser. No. 370,640 filed Apr. 21, 1982, now abandoned.

BACKGROUND

This invention relates to shift bracket assemblies for use on shift rails of manually operated transmissions. More particularly the invention relates to shift bracket assemblies wherein spring loaded plungers are employed to assist in the movement of gear shift levers, and to provide or enhance physical sensing of lever position.

Prior art shift bracket assemblies have incorporated direct or "in-line" spring-loaded plungers, in combination with angularly off-set spring and poppet ball systems. The latter spring and poppet ball systems have been employed only to "spring lock" such plungers in their most outwardly or extreme positions. While the latter shift bracket assembly has been and is yet satisfactory in the operation of the lowest ratio gears of heavy duty truck transmissions, the in-line forces associated therewith have been unsatisfactory in shifting among the top end or highest ratio gears, the latter being more frequently utilized in over highway situations.

Those skilled in the art will appreciate that shift levers contain shift fingers which engage axially movable rails for effecting gear changes. There exists a strong preference for lighter shift lever control forces as related to shifts involving the highest ratio gears. This is because it is generally easier for a driver to pull a shift lever transversely toward his right knee (viz toward the first and reverse shift rail in most truck environments) than to push the lever away (viz toward the highest ratio shift rail) under an identical spring force. Thus, in over-the-road shifting in hilly areas, a lighter spring return force is desirable in association with the frequently utilized highest ratio shift rail.

The most commonly utilized prior art shift bracket assembly requires two separate spring systems in its normal operation, and is thus more complex and expensive to manufacture. Thus, a bracket is needed which will provide lighter spring return forces in shifts between highest ratio gears, and which, preferably, is also simpler and less expensive to manufacture.

SUMMARY OF THE INVENTION

The invention disclosed herein provides a more satisfactory, simpler and less costly alternative for shift bracket assemblies than those traditionally utilized in shifting among the highest ratio gears of heavy truck transmissions. Thus, while similar shift bracket assemblies have often been employed on both the lowest and highest gear ratio shift rails, the highest ratio bracket may now be rather simply modified to effect lower and more desirable spring return forces. The assembly requires only one of the two commonly utilized spring systems, and can be easily retrofitted on current vehicles utilizing multiple spring systems wherein the spring return forces are of the direct or in-line type.

In a preferred embodiment the shift bracket assembly is fixed to an axially movable shift rail for movement therewith, the bracket including a transversely aligned and stepped bore. The bore contains a slidably and matingly stepped plunger, wherein the plunger includes a cam surface disposed for coaction with a spring loaded poppet ball. The invention provides for the elimination of all in-line or direct spring forces against the plunger, as the poppet ball maintains continuous contact with the cam surface in all operative positions of the plunger.

DETAILED DESCRIPTION OF PREFERRED EMBODIMENT

Figure 1:
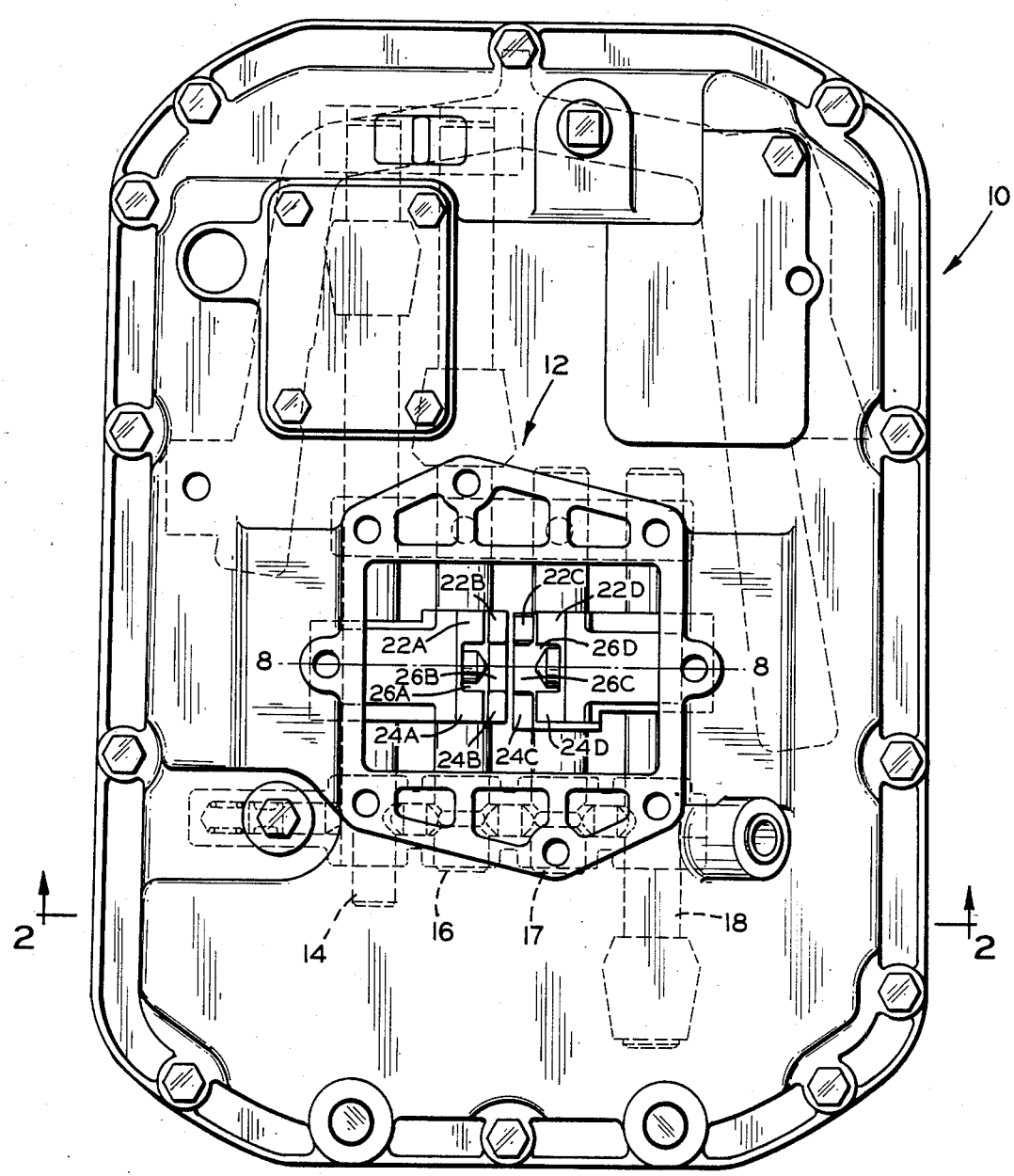
FIG. 1 is a plan view in section of a heavy duty transmission, which includes shift control apparatus incorporating the present invention.
Figure 2:
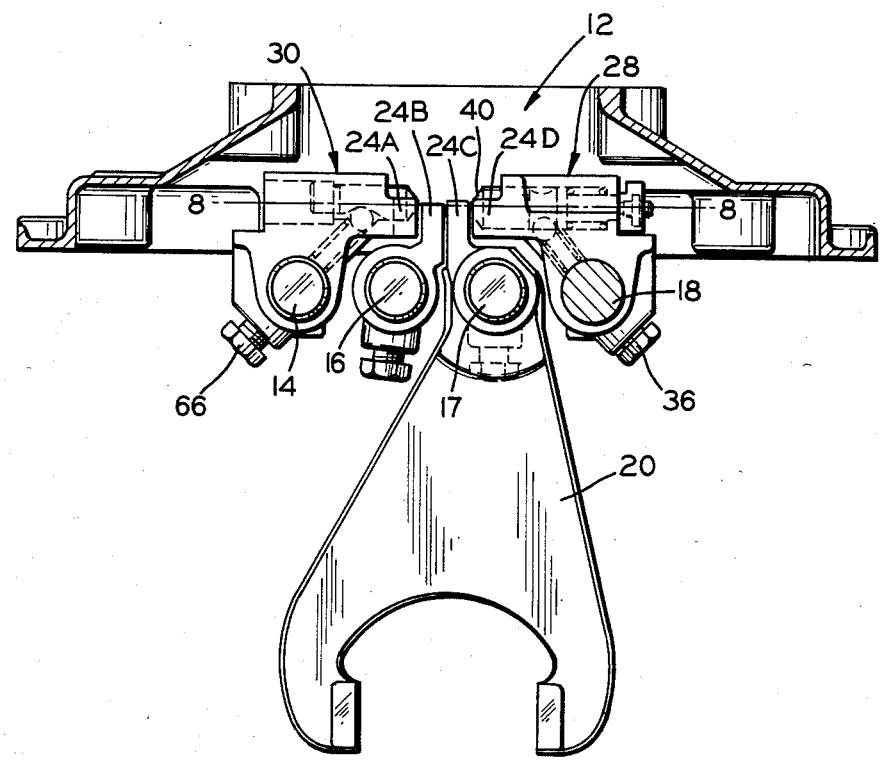
FIG. 2 is a view along lines 2—2 of FIG. 1.

FIG. 1 is a top sectional plan view of a heavy duty truck transmission 10, showing shift control apparatus 12 which incorporates the bracket assembly of the present invention. Although the present invention can be utilized in various arrangements of manually shifted transmissions, the transmission shown in FIGS. 1 and 2 is for illustration purposes only, and the invention is accordingly not to be so limited.

The shift control apparatus 12 includes shift rails 14, 16, 17, and 18 for seven forward speeds and one reverse speed; the shift rail 14 representing the highest gears, sixth and seventh, the shift rail 16 representing next highest gears, fourth and fifth, shift rail 17 representing lower gears, second and third, and shift rail 18 representing the lowest ratio gears, first and reverse. Referring now to FIG. 2, each of the shift rails supports the movement of one shift fork 20 axially oriented in the transmission, as shown representatively only for the shift rail 17, which controls shifting of second and third gears. Each shift fork 20 is fixed to its respective shift rail, e.g. 17, and includes a pair of lugs 22 and 24 (FIG. 1) which defines a channel or slot 26 for receiving a shift finger (not shown), as per conventional practice. For convenience, lugs 22 and 24, and channel 26, are particularly defined with suffixes A, B, C, and D to show correspondence and association with shift rails 14, 16, 17, and 18, respectively.

Figure 3:
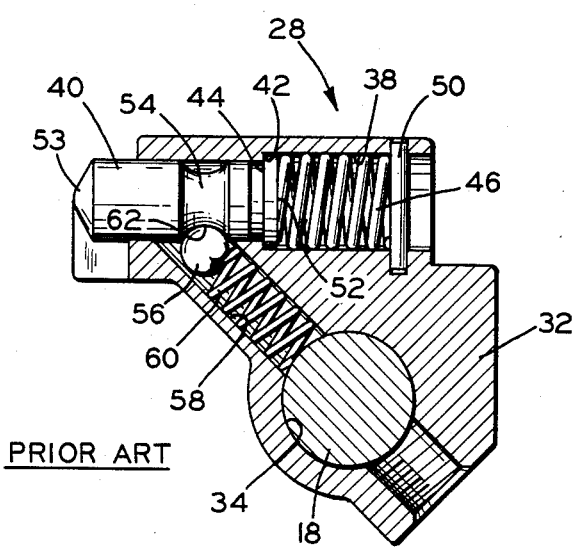
FIG. 3 is a sectional view of a prior art shift bracket assembly.

Shift bracket assemblies 28 and 30 (FIG. 2) are affixed to shift rails 18 and 14, the lowest and highest ratio rails, respectively. The latter shift bracket assemblies are shown in greater detail in FIGS. 3 and 4. Referring first to FIG. 3, an existing or prior art shift bracket assembly 28, suitable for use with the lowest ratio rail, is first described, both to provide background as well as to make distinction of the old from the new. The prior art bracket, which has also commonly but unsatisfactorily been employed with highest ratio rails, includes a housing 32 which includes a bore 34 by which the housing 32 is secured to the shift rail 18 by a threaded screw 36 (FIG. 2). The bore 34 extends axially, and perpendicularly or transversely thereto extends a second bore 38, which slidably contains a plunger 40. The bore and plunger are stepped, for limiting movement of the plunger 40 in one direction only. Thus, shoulders 42 and 44 of the bore and plunger, respectively, act one against the other to provide a mechanical stop or limit for plunger movement. The plunger is thus force lockingly retained within the bore against the pressure of in-line spring 46 which bears between a roll pin 50 and the rear end 52 of the plunger 40. The plunger contains an annular groove 54 against which a poppet ball 56 is urged to secure the plunger in its extended position as shown. The groove is arcuate, having a radius equal to that of the ball, whereby the ball secures the plunger in a manner such that the plunger does not rotate. For this purpose, the housing 32 contains a third bore 58 connecting the two previously mentioned bores 34 and 38, the bore 58 containing a second spring 60 interposed between the poppet ball 56 and the shaft 18.

The operation of the shift bracket assembly 28 may now be described as follows. As a truck driver down shifts from second or third gear to first gear, the shift finger of his shift lever will bear against the end 53 of plunger 40, as the finger leaves the channel or slot 26C (FIG. 1) and moves into the slot 26D. The plunger 40 and associated spring 46 will provide the driver with a "feel" of the position of the shift finger as movement of the finger into the shift rail 18 is effected. It will be noted that the spring return forces herein explained are provided for and "felt" only in the neutral mode of the transmission, thus only along the transversely extending neutral shift axis 8—8. Thus, once the slot 26D is engaged and the operator moves the axially movable rail 18 into first or reverse positions, the spring forces will no longer be felt.

Upon opposite movement, at which time the operator moves the lever along the neutral shift axis 8—8 from the rail 18 to the shift rail 17 for engagement of second or third gear positions, the spring 46 will assist in urging the gear shift lever over to the next adjacent shift rail. It may be noted that prior art shift brackets 28 of the type herein described occasionally have very high in-line or direct return forces which tend to urge the shift lever objectionably beyond the next adjacent lower shift rail, notwithstanding that the truck driver may be exerting a pull on the lever to compensate for an undesirably high force. Thus the present invention may also be suitable for application to the lowest or first and reverse, shift rails where the noted problem is particularly severe, or as otherwise preferred.

The physical operation of the plunger 40 (FIG. 3) may now be more fully described as follows. As the operator moves the shift lever to the shift rail 18, the plunger 40 is depressed against the bias of the spring 46, and the poppet ball 56 is urged downwardly against the spring 60 as the plunger 40 is depressed. It will be noted that after the poppet ball is out of the groove 54, the ball ceases to urge the plunger in an outwardly direction. Thus, once the ball 56 is beyond the edge 62 of the groove 54, the spring 60 and ball 56 are ineffective to extend the plunger 40. This particular aspect of the prior art bracket 28 provides a distinctive limitation of the prior art, as will become more fully appreciated upon description of the bracket 30 of the present invention.

Figure 4:
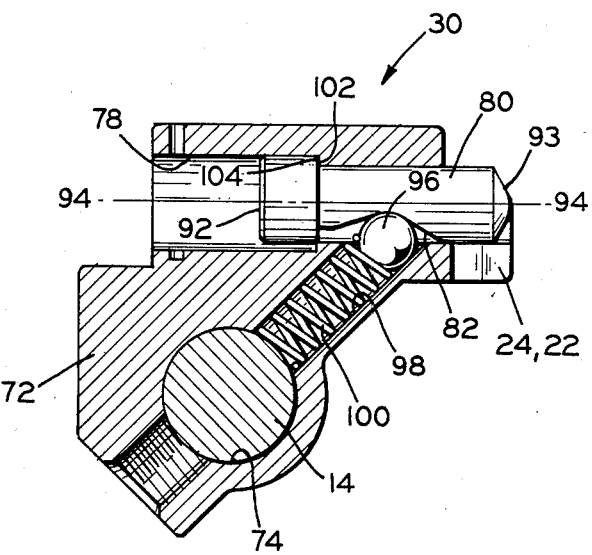
FIG. 4 is a cross sectional view of the shift bracket assembly of the present invention.

Referring now to FIG. 4 the bracket 30 of the present invention is depicted, which includes a housing 72, as well as bores 74 and 78, the latter bores being analagous to the bores 34 and 38 of the prior art bracket 28 of FIG. 3. Similarly, a threaded nut 66 (FIG. 2) holds the bracket 30 into place on its shift rail 14. Moreover a plunger 80 and bore 78 are stepped, having shoulders 102 and 104, respectively, for limiting movement of the plunger against the spring forces imposed thereon. An end 93 of the plunger 80 is disposed for engagement with a shift finger. The similarities, however, end at this point. The stepped plunger 80 defines a cam surface 82 in lieu of the groove 54 of the prior art plunger 40. The cam surface 82 is angled toward the shift finger lugs 22,24 in a manner whereby the plunger 80 is urged into the slot or channel 26 by the action of a spring 100 and poppet ball 96. Preferably, the cam surface 82 is oriented at an angle in the range of 25 to 35 degrees from the longitudinal axis 94—94 of the plunger 80, as shown in FIG. 4. The spring 100 urges the poppet ball 96 against the cam surface 82 of the plunger 80 at all operative positions of the plunger within the bore 78.

As apparent, the spring and poppet ball are also angularly disposed toward the shift finger engaging lugs 22,24 to provide force in a direction for urging the plunger against its rightward limit. In this manner, the spring 46 and roll pin 50 of the prior art bracket 28 are neither required nor desirable. The direct or in-line forces created by the latter spring 46 are avoided, and lighter control forces may be achieved, via the use of standard parts. Thus, the bracket of the present invention provides an easily retrofitted, relatively simple alternative bracket assembly which employs a lighter spring return force for the highest ratio shift rail of the transmission.

Figure 5:
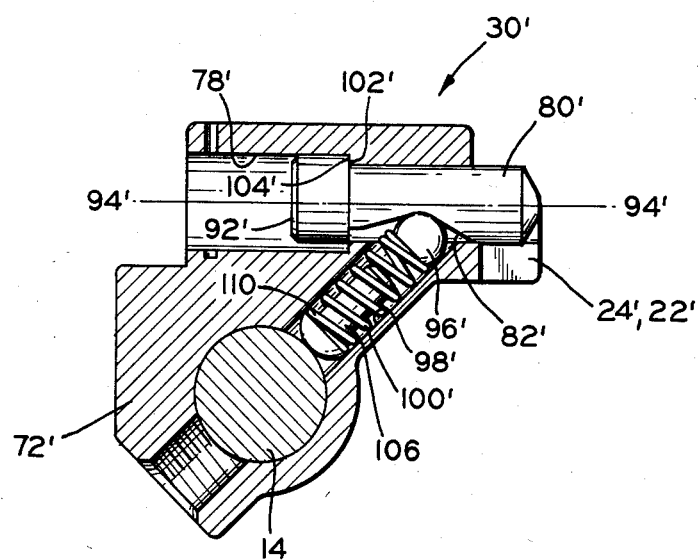
FIG. 5 is a cross sectional view of a second preferred embodiment of the shift bracket assembly of the present invention.
Figure 6:
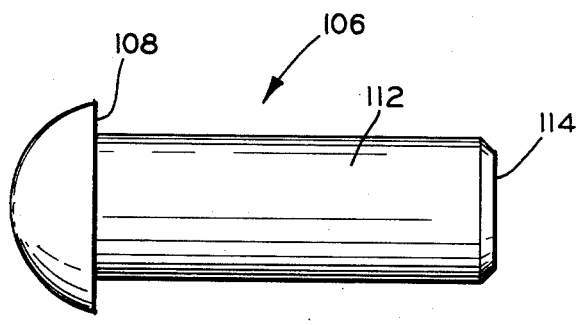
FIG. 6 is a view of a preload pin as utilized in the preferred embodiment of FIG. 5.

Referring to FIG. 5, an alternate embodiment of the bracket 30 is shown as bracket 30'. In this embodiment, a preload pin 106 is installed in the bore 98' of the bracket housing 72' along with the spring 100'. The preload pin 106, more particularly shown in FIG. 6, provides a shoulder 108 for support of the inboard end 110 of the spring 100', while the body or shank 112 of the pin 106 provides for greater support of the spring. Thus, the pin 106 will permit use of more fragile springs for achievement of even lighter spring forces. Also the end 114 of the pin 106 will provide a spring compression limit, thus protecting the spring from compression overload and resultant early fatigue failure.

What is claimed is:

1. In a shift bracket assembly for a manually operated transmission, said bracket disposed for affixation to, and movement with, an axially movable shift rail, said bracket including shift finger engaging means, and a transversely aligned bore terminating at said engaging means, a plunger slidably disposed within said bore, one end of said plunger defining means for contacting a shift finger, the opposite end thereof including means for limiting transverse movement of said plunger; an improvement comprising said plunger defining a cam surface, said surface angled in a direction toward said shift finger engaging means, and means for urging said plunger against said means for limiting transverse movement of said plunger toward said shift finger, said means for urging being constantly biased into engagement with said surface in all operative position of said plunger, and wherein said means for urging further comprises a spring loaded poppet ball defined by a spring and poppet ball, said spring bearing against said rail, said ball in contact with said surface of said plunger, said ball being interposed between said spring and said furface.

2. The shift bracket assembly of claim 1 wherein said spring and poppet ball are angularly disposed so as to provide a force in a direction for urging said plunger against said means for limiting transverse movement thereof.

3. The shift bracket assembly of claim 2 wherein said cam surface is oriented at an angle in the range of 25°-35° from the longitudinal axis of said plunger, whereby said spring and poppet ball are disposed against said cam surface so as to urge said plunger in said one direction.

4. The shift bracket assembly of claim 3 wherein said means for limiting movement of said plunger toward said shift finger comprises a shoulder at one end of said plunger, and a matingly engaging shoulder within said bore, whereby contact between said respective shoulders effects a movement limit of said plunger in one direction only.

5. The shift bracket assembly of claim 4 wherein said shift finger engaging means comprises a pair of lugs fixed to said bracket and defining a channel.

6. The shift bracket assembly of claim 1 wherein said means for urging comprises a spring loaded poppet ball apparatus defined by a spring, poppet ball, and preload pin, said preload pin comprising a shoulder disposed for support of one end of said spring, said preload pin including a shank for supporting said spring, whereby said ball is urged into contact with ssid surface of said plunger, said ball being interposed between said spring and said surface, and wherein said shank defines an end which provides means for limiting the compression of said spring.

7. The shift bracket assembly of claim 6 wherein said spring, preload pin, and poppet ball are angularly disposed so as to provide a force in a direction for urging said plunger against said means for limiting transverse movement thereof.

* * * * *